United States Patent
Lee et al.

(10) Patent No.: US 9,400,219 B2
(45) Date of Patent: Jul. 26, 2016

(54) METALLIC LAYER-BY-LAYER PHOTONIC CRYSTALS FOR LINEARLY-POLARIZED THERMAL EMISSION AND THERMOPHOTOVOLTAIC DEVICE INCLUDING SAME

(75) Inventors: Jae-Hwang Lee, Chestnut Hill, MA (US); Kai-Ming Ho, Ames, IA (US); Kristen P. Constant, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 1098 days.

(21) Appl. No.: 12/754,657

(22) Filed: Apr. 6, 2010

(65) Prior Publication Data

US 2010/0294325 A1   Nov. 25, 2010

Related U.S. Application Data (60) Provisional application No. 61/179,468, filed on May 19, 2009.

(51) Int. Cl.
*H01L 35/02* (2006.01)
*G01J 5/52* (2006.01)
(Continued)

(52) U.S. Cl.
CPC ................. *G01J 5/522* (2013.01); *G01J 3/108* (2013.01); *H02S 10/30* (2014.12)

(58) Field of Classification Search
CPC ............ G01J 3/108; G01J 5/522; H02S 10/30
USPC ......................................... 136/253
See application file for complete search history.

(56) References Cited

U.S. PATENT DOCUMENTS

| | | |
|---|---|---|
| 2,859,369 A | 11/1958 | Williams et al. |
| 5,136,678 A | 8/1992 | Yoshimura |
| 6,027,595 A | 2/2000 | Suleski |

(Continued)

FOREIGN PATENT DOCUMENTS

| | | |
|---|---|---|
| EP | 0871979 A1 | 10/1998 |
| WO | WO 2005/052987 A1 | 9/2005 |

OTHER PUBLICATIONS

"Polarized thermal radiation by layer-by-layer metallic emitters with sub-wavelength grating", 2008, Jae-Hwang Lee, Wai Leung, Tae Guen Kim, Kristen Constant and Kai-Ming Ho.*

(Continued)

*Primary Examiner* — Matthew Martin
(74) *Attorney, Agent, or Firm* — Reinhart Boerner Van Deuren P.C.

(57) ABSTRACT

Metallic thermal emitters consisting of two layers of differently structured nickel gratings on a homogeneous nickel layer are fabricated by soft lithography and studied for polarized thermal radiation. A thermal emitter in combination with a sub-wavelength grating shows a high extinction ratio, with a maximum value close to 5, in a wide mid-infrared range from 3.2 to 7.8 μm, as well as high emissivity up to 0.65 at a wavelength of 3.7 μm. All measurements show good agreement with theoretical predictions. Numerical simulations reveal that a high electric field exists within the localized air space surrounded by the gratings and the intensified electric-field is only observed for the polarizations perpendicular to the top sub-wavelength grating. This result suggests how the emissivity of a metal can be selectively enhanced at a certain range of wavelengths for a given polarization.

12 Claims, 5 Drawing Sheets

(51) Int. Cl.
 G01J 3/10 (2006.01)
 H02S 10/30 (2014.01)

(56) References Cited

U.S. PATENT DOCUMENTS

| | | | |
|---|---|---|---|
| 6,268,685 B1 | 7/2001 | Stark et al. | |
| 6,274,293 B1 | 8/2001 | Gupta | |
| 6,309,906 B1 | 10/2001 | Meier et al. | |
| 6,355,198 B1 | 3/2002 | Kim et al. | |
| 6,358,653 B1* | 3/2002 | Turberfield et al. | 430/18 |
| 6,479,371 B2* | 11/2002 | Noda | 438/455 |
| 6,538,087 B2 | 3/2003 | Zhao et al. | |
| 6,552,760 B1 | 4/2003 | Gotoh et al. | |
| 6,555,406 B1 | 4/2003 | Leung et al. | |
| 6,583,350 B1* | 6/2003 | Gee et al. | 136/253 |
| 6,586,775 B2 | 7/2003 | Hirayama | |
| 6,611,085 B1 | 8/2003 | Gee et al. | |
| 6,677,175 B2 | 1/2004 | Zhao et al. | |
| 6,768,256 B1 | 7/2004 | Fleming et al. | |
| 6,852,203 B1 | 2/2005 | Kawakami et al. | |
| 6,858,079 B2 | 2/2005 | Norris et al. | |
| 6,860,330 B2 | 3/2005 | Jackson | |
| 6,869,330 B2 | 3/2005 | Gee et al. | |
| 6,898,362 B2 | 5/2005 | Forbes et al. | |
| 6,940,174 B2 | 9/2005 | Lin et al. | |
| 6,977,768 B2 | 12/2005 | Yamaguchi | |
| 6,979,105 B2 | 12/2005 | Leysath | |
| 7,078,697 B2 | 7/2006 | Barker et al. | |
| 7,085,038 B1 | 8/2006 | Etheridge, III et al. | |
| 7,141,617 B2 | 11/2006 | Gratson et al. | |
| 7,625,515 B2 | 12/2009 | Lee et al. | |
| 2003/0008244 A1 | 1/2003 | Khanarian et al. | |
| 2003/0201429 A1 | 10/2003 | He et al. | |
| 2004/0036814 A1 | 2/2004 | Yamaguchi | |
| 2005/0166837 A1 | 8/2005 | Marshall | |
| 2008/0231184 A1 | 9/2008 | Lee et al. | |

OTHER PUBLICATIONS

"1D and 2D Photonic Crystals for Thermophotovoltaic Applications", 2004, Ivan Celanovic, Francis O'Sullivan, Natalija Jovanovic, Minghao Qi and Jonh Kassakian.*

Informaton Optics and Photonics: Algorithms, Systems, and Applications, Thierry Fournel, Bahram Javidi.*

Nagpal, "Efficient Low-Temperature Thermophotovoltaic Emitters from Metallic Photonic Crystals", Nano Letters, 2008.*

U.S. Appl. No. 12/753,405, filed Apr. 2, 2010, Dalal.

Zhi-Yuan Li et al., "Photonic band structures . . . ", article, 2003, Physical Review E 67, 11 pages.

Jae-Hwang Lee et al., "Woodpile Metallic Photonic . . . ", article, 2007, Adv. Mater. 2007, 19, 791-794, 4 pages.

S.Y. Lin et al., "Three-Dimensional photonic-crystal . . . ", article, Jul. 14, 2003, Applied Physics Letters, vol. 83, No. 2, 4 pages.

A. Heinzel et al., "Radiation filters and emitters . . . ", article, 2000, Journal of Modern Optics, 2000, vol. 47, No. 13, 2399-2419.

M. U. Pralle et al., "Photonic crystal enhanced . . . ", article, 2002, Applied Physics Letters, vol. 81, No. 25, 4 pages.

Hitoshi Sai et al., "High-temperature resistive . . . " article, 2003, Applied Physics Letters, vol. 82, No. 11, Mar. 17, 2003, 4 pages.

Snorri Ingvarsson et al., "Enhanced thermal emission . . . ", article, Sep. 3 / vol. 15, No. 18 / Optics Express, 6 pages.

Peter J. Hesketh et al., "Polarized spectral emittance . . . ", article, Physical Review B, vol. 37, No. 18, Jun. 15, 1988-II, 10 pages.

Terubumi Saito et al., "Polarization Characteristics of silicon . . . ", article, Rev. Sci. Instrum. 67, 3362 (1996), 3 pages.

Paul V. Braun et al., "Electrochemical Fabrication of 3D . . . ", article, Adv. Mater. 2001, 13, No. 7, Apr. 4.

Vikram L. Dalal et al., "Alternative designs for . . . ", article, Journal of Non-Crystalline Solids 354 (2008) 2403-2406, 4 pages.

Atul Madhavan et al., "Nanocrystalline Si Superlattice Solar Cell", power point presentation, Iowa State University, Aug. 23, 2009, 35 pages.

Hitoshi Sai et al., "Spectral and thermal . . . ", article, 3rd World Conference on Photovoltaic Energy Conversion, May 11-18, 2003 Osaka Japan, 4 pages.

Atul Madhavan et al., "Superlattice structures for . . . ", manuscript, Iowa State University, 2008, 6 pages.

Andreas Stein et al., "Colloidal crystal templating . . . ", article, Current Opinion in Solid State and Materials Science 5 (2201) 553-564.

Jae-Hwang Lee et al., "Diffracted moire fringes . . . " article, Applied Physics Letters 86, (2005), 3 pages.

K K Mendu et al., "Fabrication of multi-layered . . . ", article, Institute of Physics Publishing, Nanotechnology 16 (2005) 1965-1968, 5 pages.

X. Wei et al., "Ceramic-Metal Interpenetrating . . . " article, Journal of the Electrochemical Society, 152 (8) C513-519 (2005), 7 pages.

Jae-Hwang Lee et al., "Two-Polymer Microtransfer . . . ", article, Adv. Mater. 2005, 17, 2481-2485.

R. S. Bergman et al., "Applications of thin . . . ", article, IEE Proceedings—A, vol. 140, No. 6, Nov. 1993, 10 pages.

Alfred Thelen, "Design of a hot mirror: contest results", article, Applied Optics / vol. 35, No. 25 / Sep. 1, 1996, 11 pages.

Mikrajuddin et al., "Single Route for . . . ", article, Adv. Mater. 2002, 14 No. 12, Jun. 18, 4 pages.

Lianbin et al., "Synthesis and Magnetic . . . " article, Adv. Mater. 2003, 15, No. 18, Sep. 16, 3 pages.

Jeffrey S. King et al., "TiO$_2$ Inverse Opals . . . ", article, Adv. Mater. 2005, 17, No. 8, Apr. 18, 4 pages.

Shawn-Yu Lin, "Experimental observation of . . . " article, Applied Physics Letters, vol. 83, No. 4, Jul. 28, 2003, 3 pages.

J. S. King et al., "High-filing-fraction . . . ", article, Applied Physics Letters, vol. 83, No. 13, Sep. 29, 2003, 3 pages.

Jean-Michel Lourtioz et al., "Microcavities and photonic . . . ", article, C.R. Phsique 3 (2002) 79-88, 10 pages.

Lianbin Xu et al., "Electrodeposited nickel and gold nanoscale . . . ", article, Chem. Commun., 2000, 997-998, 2 pages.

Irina Puscasu et al., "Extraordinary emission from . . . ", article, Journal of Applied Physics 98, (2005), 013531 6 pages.

Beatriz H. Juarez et al., "Formation of Zinc Inverted . . . ", article, J. Phys. Chem B 2004, 108, 16708-16712, 5 pages.

Timothy D. Drysdale et al., "Metallic tunable photonic . . . ", article, J. Vac. Sci. Technol. B 21(6), Nov./Dec. 2003, 5 pages.

C. Cuisin et al., "Fabrication of three-dimensional . . . ", article, J. Vac. Sci. Technol. B 18(6), Nov./Dec. 2000, 5 pages.

F. Romanato et al., "Fabrication of 3D metallic photonic . . . ", article, Microelectronic Engineering 67-68 (2003) 479-486, 8 pages.

J.G. Fleming et al., "All-metallic three-dimensional . . . ", article, Nature / vol. 417 / May 2, 2002, 4 pages.

Ivan Celanovic et al., "Resonant-cavity enhance thermal emission", article, Physical Review B 72, 075127 (2005), 5 pages.

M. Laroche et al., "Coherent Thermal Antenna . . . ", article, Physical Review Letters, PRL 96, 123903 (2006), 4 pages.

Anvar A. Zakhidov et al., "Carbon Structures with . . . ", article, Science, vol. 282, Oct. 30, 1998, 5 pages.

Jae-Hwang Lee et al., "Polarized thermal radiation . . . ", article, Ames Laboratory U.S. Doe, Iowa State University, Department of Electronics Engineering, Korea University, known prior to Apr. 6, 2010, 6 pages.

* cited by examiner

METALLIC LAYER-BY-LAYER PHOTONIC CRYSTALS FOR LINEARLY-POLARIZED THERMAL EMISSION AND THERMOPHOTOVOLTAIC DEVICE INCLUDING SAME

CROSS-REFERENCE TO RELATED PATENT APPLICATION

This patent application claims the benefit of U.S. Provisional Patent Application No. 61/179,468, filed May 19, 2009, the entire teachings and disclosure of which are incorporated herein by reference thereto.

STATEMENT REGARDING FEDERALLY SPONSORED RESEARCH AND DEVELOPMENT

This invention was made in part with Government support under Grant Number DE-ACO2-06CH11358 awarded by the Department of Energy. The Government has certain rights in this invention.

FIELD OF THE INVENTION

This invention generally relates to thermophotovoltaic (TPV) devices, and more particularly to polarized thermal emitters (PTE) for use in TPV devices.

BACKGROUND OF THE INVENTION

As the sun is one of the most sustainable and reliable future sources of energy, photovoltaic (PV) devices are highlighted in both research and industrial areas. A photodiode in the PV devices creates a pair of charge carriers when an incident photon has an energy larger than the energy band gap ($E_g$) of the semiconducting material of the photodiode. The incident photons with energy higher than $E_g$ contribute to the photo-current and photons with energy lower than $E_g$ cannot. So the conversion efficiency of this process is maximized when all the incident photons carry the exact energy to create the charge carriers.

However, sunlight is not monochromatic but spans a wide range of wavelengths from ultraviolet to infrared. As such, the total energy carried by photons from the sun is not efficiently converted to electricity. To overcome this limitation, thermo-photovoltaic (TPV) devices are being considered. The TPV devices consist of a thermal emitter and a photodiode. If the thermal emitter can absorb all incoming photons without discrimination and re-emit photons within a narrow range of energy, optimized for the $E_g$ of the photodiode, in principle, all energy carried by the incident photons can contribute for electricity generation, which results in enhanced energy conversion efficiency.

The thermal radiation properties of the emitter must match the conversion characteristics of the photodiode to optimize energy conversion efficiency. For thermal emission in a narrow range, periodic microstructures including photonic crystals can be considered. In addition to the tuning of the energy of the re-emitted photons, the polarization of the photons is also important in the conversion efficiency of the photodiode as a photon polarized parallel to its plane-of-incidence can be absorbed without reflection loss at the Brewster's angle. The reflection of incoming photons at the surface of the photodiode is significant because of the high refractive index of most semiconductor materials and can result in major efficiency loss unless a high-cost antireflection layer is applied.

Generally, thermal radiation from a thermal source is considered unpolarized or weakly-polarized, which means the two polarizations of thermal radiation are equally distributed. However, a class of micro-structures, called polarized thermal emitters (PTEs), can emit polarized thermal radiation. Because the PTEs preferentially emit polarized photons via their structural anisotropy and not by filtering, the energy loss that always accompanies filtering is avoided. This is a clear and significant advantage for TPV devices.

A good PTE for TPV should show high radiation power only within a selected range of wavelengths and high extinction ratio, defined by P1/P2, where P1 and P2 are the radiation powers for two orthogonal polarizations.

Embodiments of the present invention provide such a PTE for use in a TPV device and methods of manufacturing same. These and other advantages of the invention, as well as additional inventive features, will be apparent from the description of the invention provided herein.

BRIEF SUMMARY OF THE INVENTION

In view of the above, embodiments of the present invention provide new and improved polarized thermal emitters (PTEs) that overcome one or more of the problems existing in the art. More particularly, embodiments of the present invention provide new and improved PTEs that are particularly well suited for application in thermophotovoltaic (TPV) and other applications. Embodiments of the present invention provide consistently polarized thermal emission with spectrally engineered emissivity. In embodiments of the present invention, highly polarized thermal emission available at normal emergence, high thermal radiation power, tunable emission range is provided.

In one embodiment of the present invention, a polarized thermal emitter (PTE) for use in a thermophotovoltaic (TPV) device includes a backplane, a first grating layer positioned on the backplane, and a second grating layer positioned on the first grating layer. Preferably, the second grating layer is oriented perpendicular to the first grating layer. One of the first grating layer and the second grating layer has a sub-wavelength periodicity. In one embodiment the first grating layer has the sub-wavelength periodicity, and in an alternate embodiment the second grating layer has the sub-wavelength periodicity.

In another embodiment of the present invention, a method of tuning the thermal response (TR) of a polarized thermal emitter (PTE) device is provided. The PTE preferably has a backplane, a first grating layer positioned on the backplane, a second grating layer positioned on the first grating layer and oriented perpendicular to the first grating layer, and wherein one of the first grating layer and the second grating layer has a sub-wavelength periodicity. The method of this embodiment includes the step of varying a periodicity of at least one of the first grating layer and the second grating layer. In one embodiment, the method further includes the step of varying a height of at least one of the first grating layer and the second grating layer. In another embodiment, the method further includes the step of changing which of the first grating layer and the second grating layer has the sub-wavelength periodicity.

In a further embodiment of the present invention, a method of tuning the thermal radiation (TR) performance of a polarized thermal emitter (PTE) device is provided. The PTE preferably has a backplane, a first grating layer positioned on the backplane, a second grating layer positioned on the first grating layer and oriented perpendicular to the first grating layer, and wherein one of the first grating layer and the second grating layer has a sub-wavelength periodicity. The method of this embodiment includes the step of changing which of the first grating layer and the second grating layer has the sub-wavelength periodicity. In a further embodiment, the method further includes the step of varying a periodicity of at least one of the first grating layer and the second grating layer. In another embodiment, the method further includes the step of varying a height of at least one of the first grating layer and the second grating layer.

In a further embodiment of the present invention, a thermophotovoltaic (TPV) device includes a polarized thermal emitter (PTE) having a backplane, a first grating layer positioned on the backplane, a second grating layer positioned on the first grating layer and oriented perpendicular to the first grating layer, and wherein one of the first grating layer and the second grating layer has a sub-wavelength periodicity. The TPV also includes a photodiode positioned to receive thermal radiation (TR) from the PTE.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Before turning specifically to the drawings, it is noted that thermal radiation (TR) properties of materials have been rigorously studied because of the importance of TR in various scientific and practical applications. Recently, periodic microstructures including photonic crystals have been shown to enable tuning of the spectral distribution of TR. Furthermore, polarization properties of TR can be tuned by planar gratings, photonic crystals and elongated nano-heaters. These controls of spectral and polarization properties of TR are potentially very important especially for thermophotovoltaic (TPV) devices.

Indeed, and as will be discussed in greater detail below, tailoring the TR properties of the emitter in a TPV device to match the conversion characteristics of the photovoltaic cell has the potential to greatly increase energy conversion efficiency. Moreover, the polarized TR source can also be extended to biological and chemical applications as many chemical substances have linear-dichroic absorption. Embodiments of the present invention provide such needed tailoring of the TR properties to realize the increase in energy conversion efficiency.

Although highly polarized TR is simply possible by a flat metallic surface at grazing emergence or even by using a polarizer with a conventional incandescent source, a major portion of supplied energy is inevitably wasted. In contrast, because the micro-structured polarized thermal-emitter (PTE) of embodiments of the present invention enables the polarized TR by selective radiation and not by filtering, the supplied energy can be used for desired TR with less loss.

Figure 1:
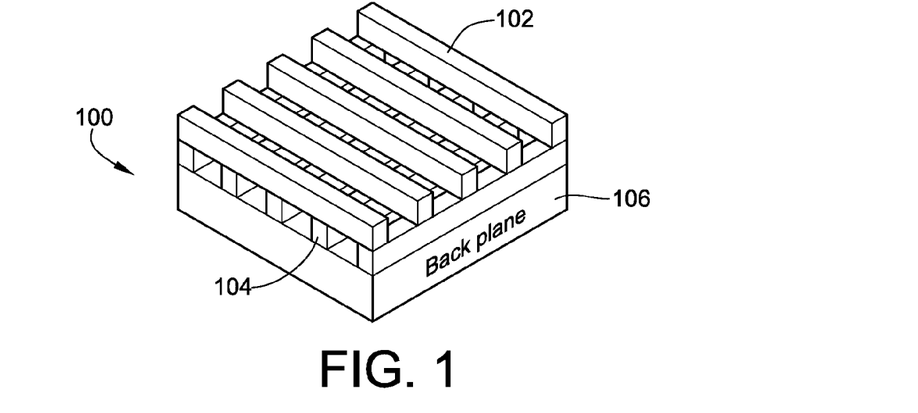
FIG. 1 is an isometric illustration of an embodiment of a micro-structured polarized thermal-emitter (PTE) constructed in accordance with the teachings of the present invention.
Figure 2:
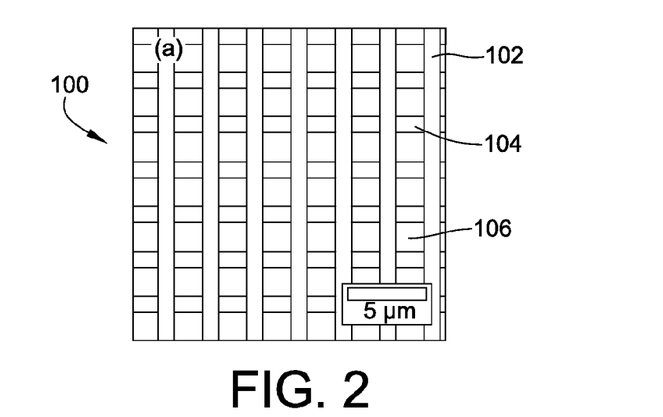
FIG. 2 is a top view illustration of a fabricated PTE of FIG. 1.
Figure 3:
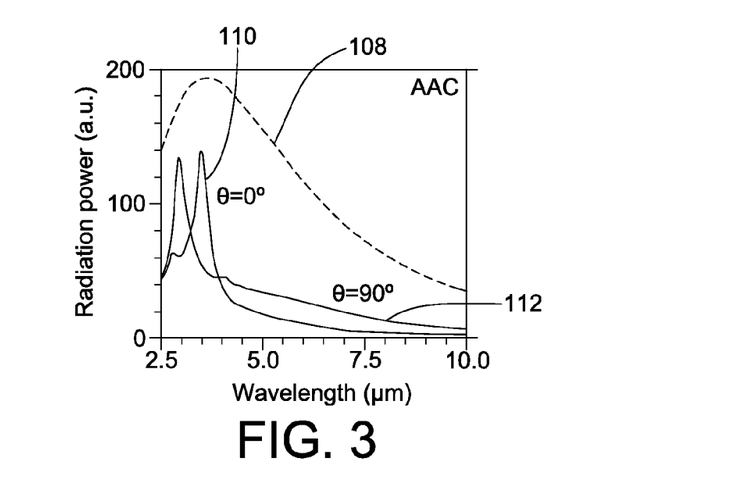
FIG. 3 is a graphical illustration of the measured thermal radiation (TR) spectra of the PTE of FIG. 1 at 800 K for two polarization angles, parallel and perpendicular to the orientation of a top grating layer of the PTE.

Briefly with reference to FIGS. 1 and 2, a PTE 100 made of two identical metallic gratings 102, 104 on a homogeneous metallic layer 106 has two narrow emission channels spectrally close together as illustrated by lines 110, 112 of FIG. 3. Because thermal radiations through the two channels are polarized perpendicular to each other, one thermal emission channel cannot effectively contribute to electrical production in TPV applications. TR from such a layer-by-layer metallic photonic crystal used as a PTE 100 with a homogeneous back-plane, i.e. the homogeneous metallic layer 106, is not only spectrally enhanced but strongly polarized.

Figure 7:
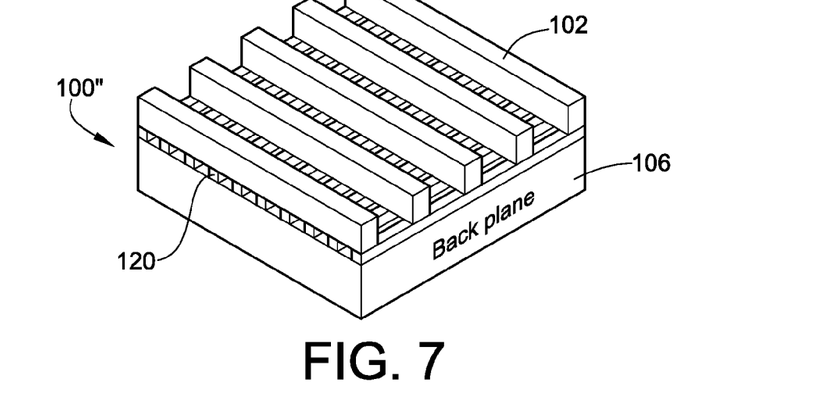
FIG. 7 is an isometric illustration of a still further embodiment of a micro-structured polarized thermal-emitter (PTE) constructed in accordance with the teachings of the present invention.

As will be discussed more fully below, it was determined that variations of the layer-by-layer structure to be used as a PTE 100' (see FIGS. 4) and 100" (see FIG. 7) can be used to affect or tune the TR emitted thereby. The variations include providing different periodicities for the two metallic grating layers (e.g. the periodicity of grating 114 vs. the periodicity of grating 104 in FIG. 4 or the periodicity of grating 102 vs. the periodicity of grating 120 in FIG. 7), and providing one of the gratings (e.g. grating 114 of FIG. 4 or grating 120 of FIG. 7) at a sub-wavelength periodicity. Different embodiments of the PTE 100' and the PTE 100" demonstrates a high extinction ratio, close to 5 for the embodiment of FIG. 4, as well as a high emissivity in a mid-infrared range from 3 μm to 5 μm. As the range is tunable by adjusting structural parameters, embodiments of the PTE will be very useful for improving the conversional efficiency of thermophotovoltaic (TPV) devices.

Figure 4:
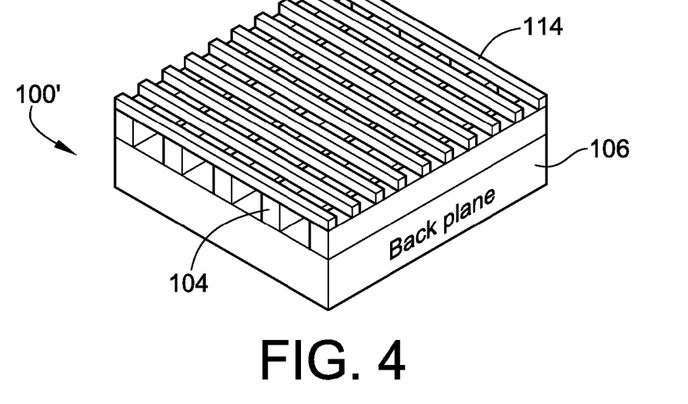
FIG. 4 is an isometric illustration of a further embodiment of a micro-structured polarized thermal-emitter (PTE) constructed in accordance with the teachings of the present invention.
Figure 6:
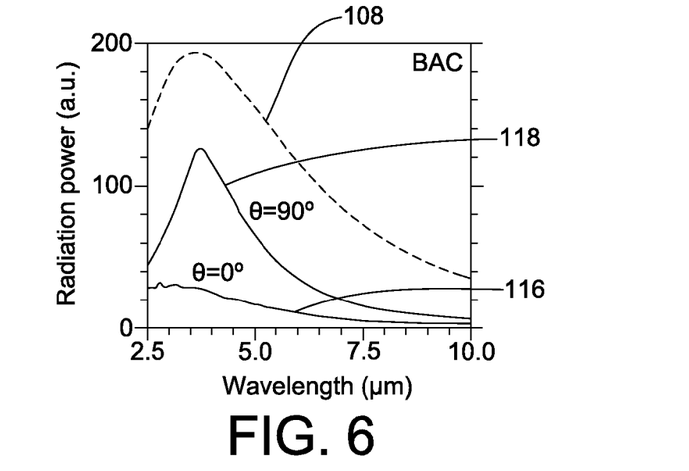
FIG. 6 is a graphical illustration of the measured thermal radiation (TR) spectra of the PTE of FIG. 4 at 800 K for two polarization angles, parallel and perpendicular to the orientation of a top grating layer of the PTE.

In the embodiment of the PTE 100' illustrated in FIG. 4, one polarization channel is suppressed as shown by trace 116 of FIG. 6 by using a sub-wavelength grating 114 as a top layer, leaving the grating 104 of the first layer unaltered. The PTE 100' can enhance the emissivity of nickel for one polarization more than 5 times as shown by the trace 118 of FIG. 6 while the emissivity for the other polarization remains equivalent to that of bulk nickel as shown by trace 116. The dominant polarization direction is consistent through a wide range of wavelengths from 2.5 to 10 μm and the extinction ratio approaches five at the center wavelength of the emission channel as shown by trace 152 of FIG. 12. In such an embodiment, the spectral position of the emission channel is tunable by adjusting the periodicity of the bottom grating 104.

The three different layer-by-layer structures of the PTEs 100, 100', 100", may be fabricated by known processes, including by using the two-polymer micro-transfer molding technique described in U.S. Pat. No. 7,625,515 which issued Dec. 1, 2009, entitled FABRICATION OF LAYER-BY-LAYER PHOTONIC CRYSTALS USING TWO POLYMER MICROTRANSFER MOLDING, by Lee et al., and assigned to the assignee of the instant application, the teachings and disclosure of which are incorporated herein by their entireties by reference thereto.

Figure 5:
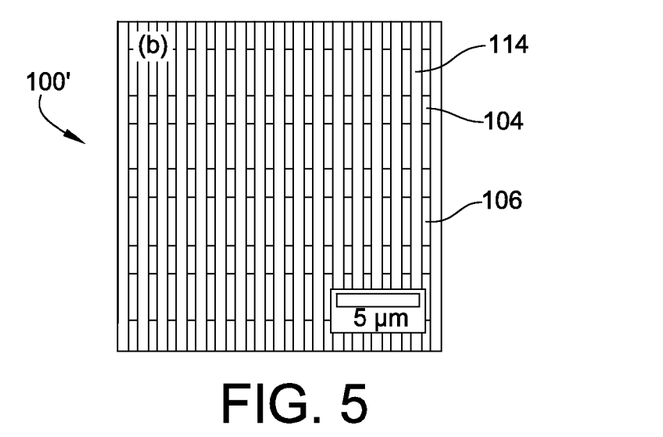
FIG. 5 is a top view illustration of a fabricated PTE of FIG. 4.
Figure 8:
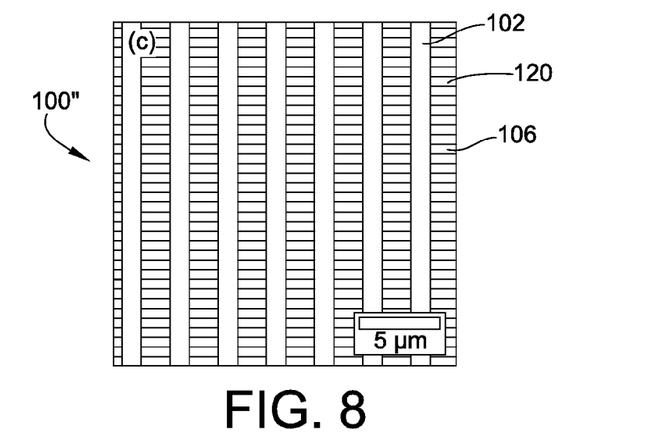
FIG. 8 is a top view illustration of a fabricated PTE of FIG. 7.

Top view illustrations of PTE 100 is shown in FIG. 2, of PTE 100' is shown in FIG. 5, and of PTE 100" is shown in FIG. 8. As a convention to be used herein, the various embodiments of the PTEs 100, 100', 100", are made of three different types of components, to wit, two different types of gratings to be referred to as type "A" and type "B", and a homogeneous back-plane referred to as type "C." Using this convention, the PTE 100 of FIG. 1 may be referred to as a type AAC PTE; the PTE 100' of FIG. 4 may be referred to as a type BAC PTE; and the PTE 100" of FIG. 7 may be referred to as a type ABC PTE.

In these exemplary embodiments, the grating "A" includes rods that are 1.1 μm wide and 1.2 μm high, with 2.6 μm of rod-to-rod spacing. The grating "B" includes rods 0.6 μm wide and 0.4 μm high, with 1.0 μm of rod-to-rod spacing. In each of these embodiments, one grating layer is perpendicular to the other and a monolithic and homogeneous nickel backplane ("C") is included. It will be recognized by those skilled in the art from the description contained herein that these dimensions may be varied in order to tune the performance of the PTE, and therefore should be taken by way of example and not by way of limitation.

In the following description the PTE 100 of FIG. 1, the type AAC PTE, as a reference. Each of the three embodiments of the PTEs 100, 100', and 100", is mounted on a heated copper block in a high vacuum chamber (~$10^{-5}$ torr) to determine the performance of each. Specifically, the TR from each PTE is collected at the surface normal angle with an acceptance angle of 5° and directed into a Fourier transform infrared spectrometer (Magna 760, Nicolet) then passed through a linear infrared polarizer (Spectra-Tech Inc.). A commercial blackbody source (M335, Mikron Infrared, Inc.) is used as a calibration source. The polarization angle of TR is set as zero when it is parallel to the orientation of a top grating layer of each of the embodiments.

Figure 9:
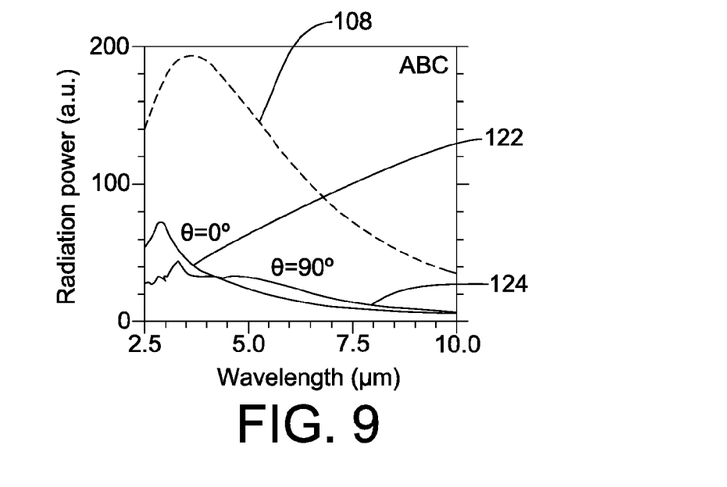
FIG. 9 is a graphical illustration of the measured thermal radiation (TR) spectra of the PTE of FIG. 7 at 800 K for two polarization angles, parallel and perpendicular to the orientation of a top grating layer of the PTE.

The TR from the PTEs at a temperature of 800K is measured for two orthogonal polarization angles, parallel and perpendicular to the orientation of the top grating layer. The temperature of the PTE is determined to maximize the TR signals in the frequency range of interest. The measured TR power of each embodiment of the PTE is shown in FIG. 3 for PTE 100, in FIG. 6 for PTE 100', and in FIG. 9 for PTE 100". As may be determined by a cursory examination of these three graphical illustrations, all three embodiments of the PTEs 100, 100', 100", show very different TR characteristics. The TR of a blackbody at the same conditions is plotted in each of these figures as trace 108.

The BAC type of FIG. 4 (PTE 100') shows a single broad-peak only for a polarization angle of 90° (see trace 118 of FIG. 6), while the AAC type of FIG. 1 (PTE 100) has sharp peaks for each polarization (see traces 110 and 112 of FIG. 3). In contrast the ABC type of FIG. 7 (PTE 100") has only minor peaks for each polarization (see traces 122, 124 of FIG. 9). The two adjacent peaks of the AAC type of FIG. 1 (PTE 100) are explained by degeneracy breaking in resonance modes of two identical gratings 102, 104 by interacting with each other. Additionally, the two-fold symmetry of each grating is still kept after stacking them, which is distinguishable from the 4-fold symmetry of a two-dimensional square lattice.

Figure 10:
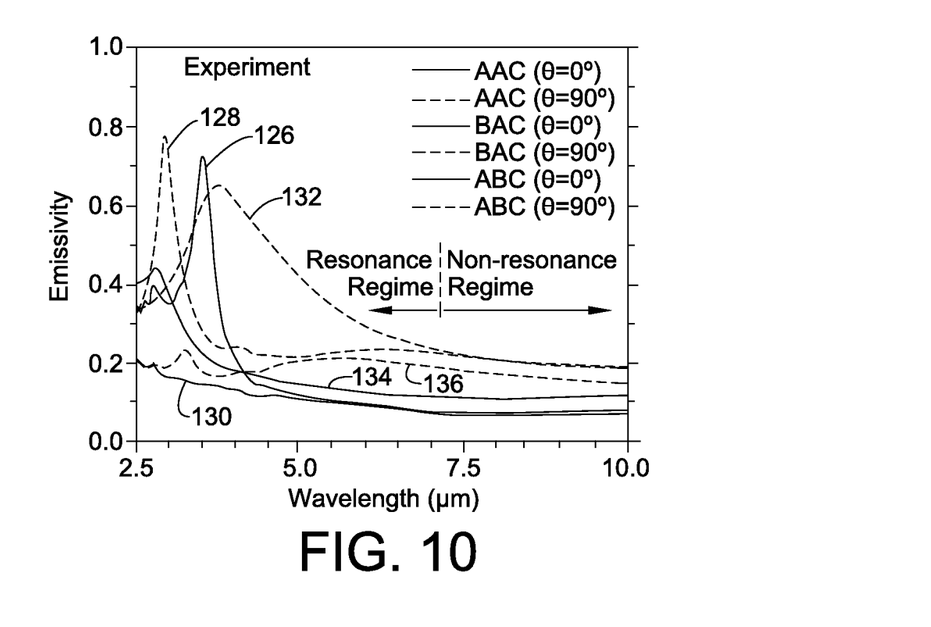
FIG. 10 is a graphical illustration of measured emissivity spectra of the embodiments of the PTEs illustrated in FIGS. 1, 4, and 7 for two polarization angles, parallel and perpendicular to the orientation of a top grating layer of each embodiment of the PTEs.

The TR spectra yield corresponding emissivity spectra appear in FIG. 10. The measured wavelength range is divided into two regimes, resonance and non-resonance, as the measured TR characteristics are very different in the two regimes. In the non-resonance regime, the emissivities of 90°-polarization (trace 128 for PTE 100, trace 132 for PTE 100', and trace 136 for PTE 100") are observed to be higher than those of 0°-polarization (trace 126 for PTE 100, trace 130 for PTE 100', and trace 134 for PTE 100") for all three exemplary PTEs 100, 100', 100". This is qualitatively explained by considering the top grating layer as a wire-grid polarizer. Since the transmission axis of the top grating layer is parallel to 90°-polarization angle, the TR from the second layer can contribute to the emissivity, in contrast to the TR of 0°-polarization. However, in the resonance regime when the wavelength of TR is comparable to the feature size of the PTEs, the emissivity of 0°-polarization can be higher due to resonance effects.

A comparison of the performance of the AAC type (PTE 100) and BAC type (PTE 100') illustrates how the emissivity can be tuned by changing the top layer from the grating "A" (grating 102 of FIG. 1) to the grating "B" (grating 114 of FIG. 4). It may be observed that the spectral emissivity of the BAC type (PTE 100') is drastically changed from that of the AAC type (PTE 100) in the resonance regime while they are almost identical in the non-resonance regime. The emission peak of the AAC type for 0°-polarization at 3.5 μm has disappeared and the other peak of the AAC type for 90°-polarization at 3.0 μm is shifted to 3.7 μm for the BAC type. In addition to the shift, the width of the peak of the AAC type is broadened, approximately 5 times in full-width-at-half-maximum (FWHM), from FWHM of 0.42 μm to FWHM of 2.0 μm, where the FWHM is defined with a half emissivity, $$\frac{1}{2}(\varepsilon_{peak} - \varepsilon_{10\mu m}) + \varepsilon_{10\mu m},$$

where $\epsilon_{peak}$ and $\epsilon_{10\,\mu m}$ are the values of emissivity at the peak and at a wavelength of 10 µm, respectively.

An efficient polarized thermal emitter (PTE) needs to have both a high emissivity and a high degree of polarization simultaneously. Because the backplane 106 (see FIGS. 1, 4, 7) boosts emissivity significantly at resonance wavelengths, the backplane 106 makes the PTEs more practical. Improved mechanical stability of the gratings at high temperature and convenience in attachment of the emitter to a heat source are other benefits of the backplane 106.

Figure 11:
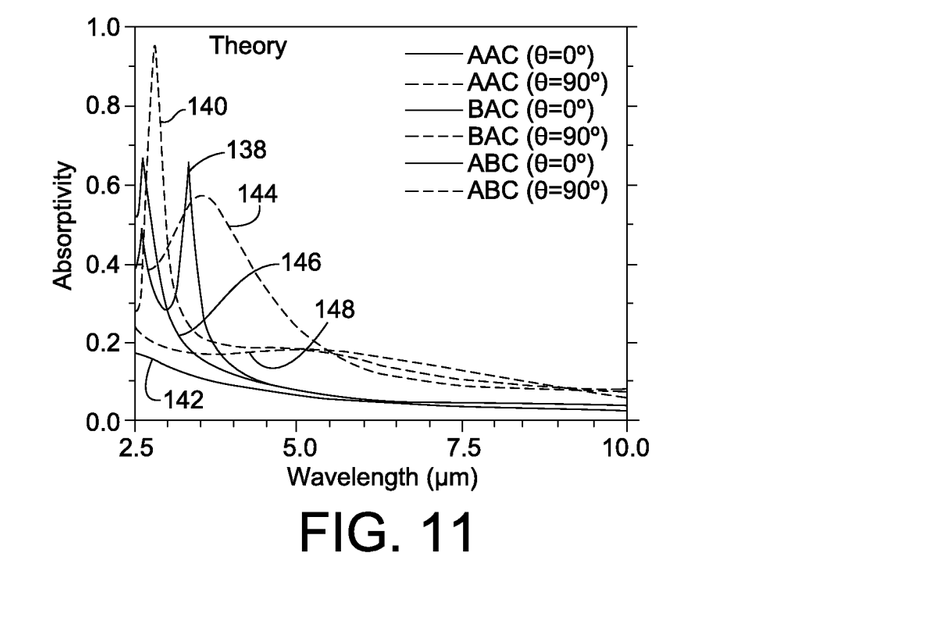
FIG. 11 is a graphical illustration of theoretically simulated absorptivity spectra of the embodiments of the PTEs illustrated in FIGS. 1, 4, and 7 for two polarization angles, parallel and perpendicular to the orientation of a top grating layer of each embodiment of the PTEs.

The absorptivity spectrum for each PTE 100, 100', 100" is numerically calculated and plotted in FIG. 11 using a plane-wave-based transfer-matrix-method. In this FIG. 11, trace 138 and 140 illustrate the absorptivity for the type AAC PTE 100 at 0°-polarization and 90°-polarization, respectively. Trace 142 and 144 illustrate the absorptivity for the type BAC PTE 100' at 0°-polarization and 90°-polarization, respectively. Trace 146 and 148 illustrate the absorptivity for the type ABC PTE 100" at 0°-polarization and 90°-polarization, respectively.

In the calculation, reflectivity for normal incidence is calculated and subtracted from unity to yield absorptivity as the transmittance of the PTEs is zero due to the homogeneous back-plane "C". The calculated absorption spectra using the published optical parameters of nickel show good agreement with the measured emissivity spectra. The remaining minor deviations may be attributed to the difference in optical parameters of electroplated nickel used in the experiment from the published data and the temperature dependency of nickel. As the simulated absorptivity represents the emissivity reasonably well, this simulation will be used for further analysis.

Figure 12:
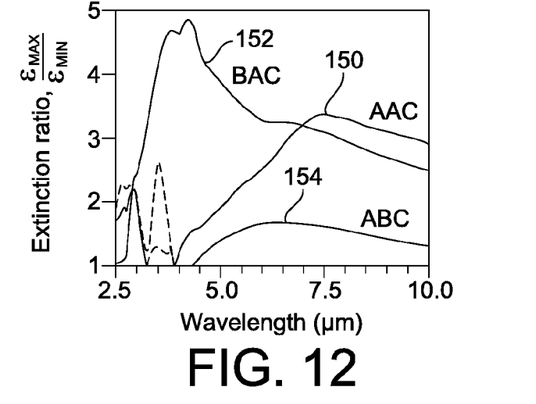
FIG. 12 is a graphical illustration of the extinction ratio deduced from the measured spectral emissivities illustrated in FIG. 10 of the embodiments of the PTEs illustrated in FIGS. 1, 4, and 7.

From the measured spectral emissivities of FIG. 10, an extinction ratio, $\epsilon_{max}/\epsilon_{min}$, is plotted in FIG. 12, where $\epsilon_{max}$ and $\epsilon_{min}$ are the maximum and the minimum emissivities between the polarizations. The BAC type PTE 100' shows an exceptionally high extinction ratio in the resonance regime as shown by trace 152, compared to the other two PTEs 100 (trace 150), 100" (trace 154), and the ratio approaches 5 at around 4 µm. Moreover, the dominant polarization is consistent in both resonance and non-resonance regimes while the dominant polarizations for the AAC type PTE 100 and the ABC type PTE 100" are reversed in the resonance regime.

The electric-field (E-field) profiles of the BAC type PTE 100' were numerically calculated for both polarizations to explain its high extinction ratio. From this it was determined that the sub-wavelength grating 114 (type "B") reflects the incident wave polarized parallel to its rods (θ=0°) and the magnitude of E-field outside is close to that of a non-structured nickel surface given by 1+√R, where R is reflectivity of nickel (~0.91 at λ=3.5 µm). This means that grating 114 (type "B") functions as a wire-grid polarizer. For the other polarization (θ=90°), a very high E-field exists within an air space surrounded by the two gratings 102, 114 (type "A" and type "B" respectively). The magnitude of the E-field in the middle of the air space is close to 6, in the other words, the enhancement in energy density is 9 times higher than the possible enhancement by a flat metallic surface of the same material. The high E-field indicates a slowed group velocity for this range of wavelengths leading to enhancement of absorption.

Figure 13:
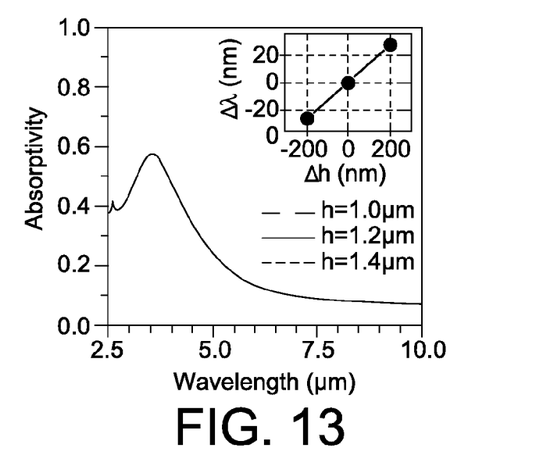
FIG. 13 is a graphical illustration of the changes in the absorptivity spectra as a function of the height of the top grating layer of the embodiment of the PTE illustrated in FIG. 4, including an inset illustrating the shift of peaks versus variation in height of the top layer grating.
Figure 14:
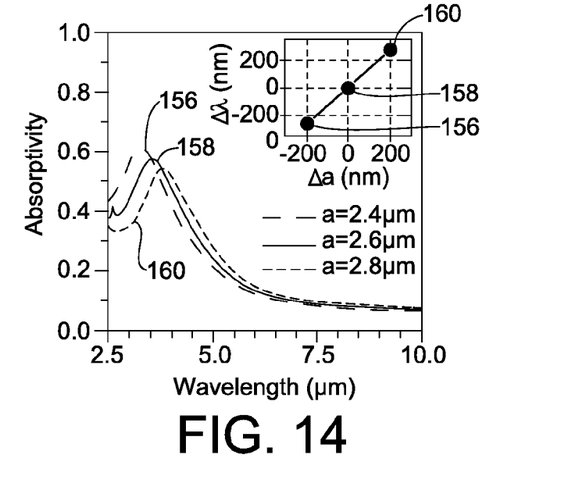
FIG. 14 is a graphical illustration of the changes in the absorptivity spectra as a function of the periodicity of the top grating layer of the embodiment of the PTE illustrated in FIG. 4, including an inset illustrating the shift of peaks versus variation in periodicity of the top layer grating.

FIGS. 13 and 14 show the absorptivity spectra for the polarization (θ=90°) as functions of the height, h, (see FIG. 13) and periodicity, a, (see FIG. 14) of the grating 102 (type "A"). The absorptivity is not very sensitive to the layer height in the interested wavelength region as shown by FIG. 13. When the original height (1.2 µm) is changed ±200 nm, for example, spectral absorptivity is almost unchanged and the peak position shifts only ±25 nm, as shown in the inset of FIG. 13. In contrast, in FIG. 14 the absorptivity spectrum shifts as much as ±260 nm for the same amount of change, ±200 nm, in the periodicity of the grating 102 (type "A") as shown by a comparison of trace 156 for −200 nm change, trace 158 for no change, and trace 160 for a +200 nm change. This shows that the air volume surrounded by the two gratings 102, 114 is more critical than the vertical air-gap between the top grating 114 (type "B") and the back-plane 106 (type "C"). FIG. 14 also shows that the maximum value of the absorptivity increases as the periodicity is decreased. This trend is also the same for the periodicity of the top grating 114 (type "B").

As discussed in the preceding, various exemplary embodiments of PTEs were fabricated and tested. These metallic thermal emitters include of two different nickel gratings on a homogeneous nickel layer backplane. Preferred embodiments include one grating that has sub-wavelength periodicity. As shown, the metallic structure can enhance the emissivity of nickel in a certain range of wavelengths with a high degree of polarization. The numerical simulations show that a high E-field is localized in the air space surrounded by the gratings for a specific polarization. The high E-field is believed to be induced by a polarization-sensitive group velocity and that this is the major origin for the spectral enhancement of emissivity. Because the control of both spectral emissivity and polarization in thermal radiation is enabled by the teachings of the present invention, highly optimized thermal emitters for TPV and sensing applications are achievable.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A polarized thermal emitter (PTE) for use in a thermophotovoltaic (TPV) device, comprising:
 a backplane;
 a first grating layer positioned on the backplane;
 a second grating layer positioned on the first grating layer and oriented substantially perpendicular to the first grating layer; and
 wherein one of the first grating layer and the second grating layer has a sub-wavelength periodicity, wherein sub-wavelength periodicity is a periodicity less than 2.5 µm.

2. The PTE of claim 1, wherein the first grating layer has a sub-wavelength periodicity.

3. The PTE of claim 1, wherein the second grating layer has a sub-wavelength periodicity.

4. The PTE of claim 3, wherein the first grating layer includes a first plurality of parallel rods approximately 1.1 µm wide and 1.2 µm high, with approximately 2.6 µm of rod-to-rod spacing, and wherein the second grating layer includes a second plurality of parallel rods approximately 0.6 µm wide and 0.4 µm high, with 1.0 µm of rod-to-rod spacing.

5. The PTE of claim 1, wherein the first grating layer and the second grating layer have different periodicities.

6. A thermophotovoltaic (TPV) device, comprising:
 a polarized thermal emitter (PTE) having a backplane, a first grating layer positioned on the backplane, a second grating layer positioned on the first grating layer and oriented perpendicular to the first grating layer, and wherein one of the first grating layer and the second grating layer has a sub-wavelength periodicity, wherein sub-wavelength periodicity is a periodicity less than 2.5 µm; and
 a photodiode positioned to receive thermal radiation (TR) from the PTE.

7. The TPV of claim 6, wherein the first grating layer has a sub-wavelength periodicity.

8. The TPV of claim 6, wherein the second grating layer has a sub-wavelength periodicity.

9. The TPV of claim 8, wherein the first grating layer includes a first plurality of parallel rods approximately 1.1 µm wide and 1.2 µm high, with approximately 2.6 µm of rod-to-rod spacing, and wherein the second grating layer includes a second plurality of parallel rods approximately 0.6 µm wide and 0.4 µm high, with 1.0 µm of rod-to-rod spacing.

10. The TPV of claim 6, wherein the first grating layer and the second grating layer have different periodicities.

11. The TPV of claim 6, wherein the first and second grating layers are configured such that the PTE has an extinction ratio greater than four.

12. The PTE of claim 1, wherein the first and second grating layers are configured such that the PTE has an extinction ratio greater than four.

* * * * *